(12) United States Patent
Feldman et al.

(10) Patent No.: US 10,976,145 B2
(45) Date of Patent: Apr. 13, 2021

(54) DEVICE FOR CHECKING BRAKE SWITCH GAP AND METHOD OF USING THEREOF

(71) Applicant: Honda Motor Co., Ltd., Tokyo (JP)

(72) Inventors: Philip Feldman, Aurora (CA); Jacob Milne, Toronto (CA)

(73) Assignee: Honda Motor Co., Ltd., Tokyo (JP)

( * ) Notice: Subject to any disclaimer, the term of this patent is extended or adjusted under 35 U.S.C. 154(b) by 282 days.

(21) Appl. No.: 16/367,070

(22) Filed: Mar. 27, 2019

(65) Prior Publication Data

US 2020/0309498 A1 Oct. 1, 2020

(51) Int. Cl.
*G01B 3/28* (2006.01)
*G01B 5/14* (2006.01)
*G01B 5/18* (2006.01)

(52) U.S. Cl.
CPC .............. *G01B 3/28* (2013.01); *G01B 5/14* (2013.01); *G01B 5/18* (2013.01)

(58) Field of Classification Search
CPC ... G01B 3/28; G01B 5/14; G01B 5/18; G01B 3/30; F16D 65/0043; B60T 17/221
USPC .......................................................... 33/836
See application file for complete search history.

(56) References Cited

U.S. PATENT DOCUMENTS

| | | | | |
|---|---|---|---|---|
| 2,579,386 A * | 12/1951 | Koenig | ............... | G01B 3/30 33/562 |
| 3,557,460 A * | 1/1971 | McFarland | ............ | G01B 3/28 33/836 |
| 5,363,562 A * | 11/1994 | Schmidt | ............... | G01B 3/306 33/567 |
| 5,657,550 A | 8/1997 | Struble | | |
| 5,870,835 A * | 2/1999 | Stieff | ............... | G01B 5/06 33/600 |
| 6,115,930 A * | 9/2000 | Shigyo | ............... | G01B 5/14 33/542 |
| 7,216,441 B2 | 5/2007 | Batora | | |
| 7,752,771 B2 | 7/2010 | Wu et al. | | |
| 2008/0173156 A1* | 7/2008 | May | ............... | G10D 13/02 84/413 |
| 2010/0031523 A1* | 2/2010 | Clark | ............... | G01B 3/20 33/610 |
| 2020/0309498 A1* | 10/2020 | Feldman | ............... | G01B 3/30 |

FOREIGN PATENT DOCUMENTS

| | | |
|---|---|---|
| CN | 201680780 U | 12/2010 |
| CN | 202938767 U | 5/2013 |
| CN | 103512471 A | 1/2014 |
| CN | 105841585 A | 8/2016 |
| JP | 2013227105 A * | 11/2013 |

* cited by examiner

*Primary Examiner* — Yaritza Guadalupe-McCall
(74) *Attorney, Agent, or Firm* — American Honda Motor Co., Inc.; Joshua Freier

(57) ABSTRACT

A device for checking gap tolerance between an adjustable portion of a brake switch and a brake pedal includes a handle and one or more probes extending from the handle. Each of the one or more probes include jaw portions defining multiple stepped regions of increasing thickness with decreasing distance from the handle and a slot extending through the multiple stepped regions. The slot is configured to be inserted between the adjustable portion of the brake switch and the brake pedal. A dimensional tolerance of the slot in at least one of the stepped regions equals a preset gap tolerance between the adjustable portion of the brake switch and the brake pedal.

20 Claims, 5 Drawing Sheets

DEVICE FOR CHECKING BRAKE SWITCH GAP AND METHOD OF USING THEREOF

TECHNICAL FIELD

The present disclosure generally relates to limit gauges. More particularly, the present disclosure relates to a device for checking gap tolerance between an adjustable portion of a brake switch and a brake pedal.

BACKGROUND

Brake switches are devices attached to brake pedal mechanisms for turning on brake lights when an operator presses a brake pedal. Additionally, brake switches may generate signals that are sent to an onboard computing device to notify the computing device that the brake pedal is either engaged or disengaged by the operator. With extended use, brake switches may malfunction due to a variety of reasons, for example, wearing out of the switch terminals, misaligned plungers, etc. Alternatively, the brake switches may malfunction due to incorrect installation. For example, while installing the brake switch, the gap between an adjustable portion of the switch and the brake pedal arm must fall within a preset tolerance prescribed by the manufacturer, however, an operator may not push the brake switch all the way in or push it too much (depressing the brake pedal), preventing optimal functioning of the brake light.

Incorrectly installed brake switches may result in malfunctions, for example, stiff brakes, abnormal brake light operation, dead batteries, as well as vehicle starting/shutting down difficulty. With increased use of common parts and suppliers across multiple model lines and automakers, a large number of vehicles may be affected if the prescribed tolerances are not met during installation. To prevent market outflow of incorrectly set brake switches, a device that permits an operator to perform quick and reliable verification of the tolerance maintained in an installed brake switch is desired. Traditionally, verification or confirmation of tolerances are achieved using measuring tools that indicate whether the tolerance maintained is too large, too small, or just right. However, measuring the gap tolerance of multiple vehicles is tedious and increases the scope for error. A device that can capture all possible failure modes for an incorrectly set brake switch (set with too large a gap or too small a gap) without measuring dimensions thereby quickening the inspection process is, therefore desired.

Typically, brake switches are installed below a steering column of a vehicle and proximal to the brake pedal arm. This area is not well lit and therefore an operator or technician's visibility is affected during inspection. For example, working under the instrument panel under minimal lighting reduces reliability of verification of the gap tolerance. As such, a verification tool that illuminates the area surrounding an installed brake switch thereby improving inspection of the brake switch is, desired.

Hence, there is a long felt, but unresolved need for a device that can capture all possible failure modes for an incorrectly set brake switch without the need to measure the dimensions of a thread or other adjusting portion. Moreover, there is a need for a verification tool that is capable of illuminating an inspection area.

SUMMARY

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

According to one embodiment, a device for checking gap tolerance between an adjustable portion of a brake switch and a brake pedal includes a handle and one or more probes extending from the handle. Each of the one or more probes include jaw portions defining multiple stepped regions. The multiple stepped region is of increasing thickness while progressing towards the handle. A slot, extending through the multiple stepped regions, is configured to be inserted between the adjustable portion of the brake switch and the brake pedal. A dimensional tolerance of the slot in at least one of the stepped regions equals a preset gap tolerance between the adjustable portion of the brake switch and the brake pedal.

According to another embodiment, a device for checking gap tolerance between an adjustable portion of a brake switch and a brake pedal includes a handle configured to house a light source, a power source, and a power circuit and a probe extending from the handle. The probe includes jaw portions that define a first stepped region, a second stepped region, a neck region, and a slot. The first stepped region is distal from the handle and the second stepped region of larger area is proximal to the handle. The first and second stepped regions are contiguously connected by a neck region. The slot, defined by the jaw portions, extend through the first and the second stepped regions and is configured to be inserted between the adjustable portion of the brake switch and the brake pedal. A dimensional tolerance of the slot in the first stepped region is smaller than a preset gap tolerance between the adjustable portion of the brake switch and the brake pedal. In the neck region of the probe, the dimensional tolerance of the slot equals the preset gap tolerance between the adjustable portion of the brake switch and the brake pedal. Moreover, in the second stepped region, the dimensional tolerance of the slot is larger than the preset gap tolerance between the adjustable portion of the brake switch and the brake pedal. This design of the device captures possible failure modes for an incorrectly set brake switch (set with too large a gap, too small a gap, just right) without measuring any dimensions thereby quickening the inspection process.

BRIEF DESCRIPTION OF THE DRAWINGS

The foregoing summary, as well as the following detailed description of the present disclosure, is better understood when read in conjunction with the appended drawings. For the purpose of illustrating the present disclosure, exemplary constructions of one or more embodiments are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The present disclosure generally relates to limit gauges. More particularly, the present disclosure relates to a device for checking gap tolerance between an adjustable portion of a brake switch and a brake pedal.

Figure 1:
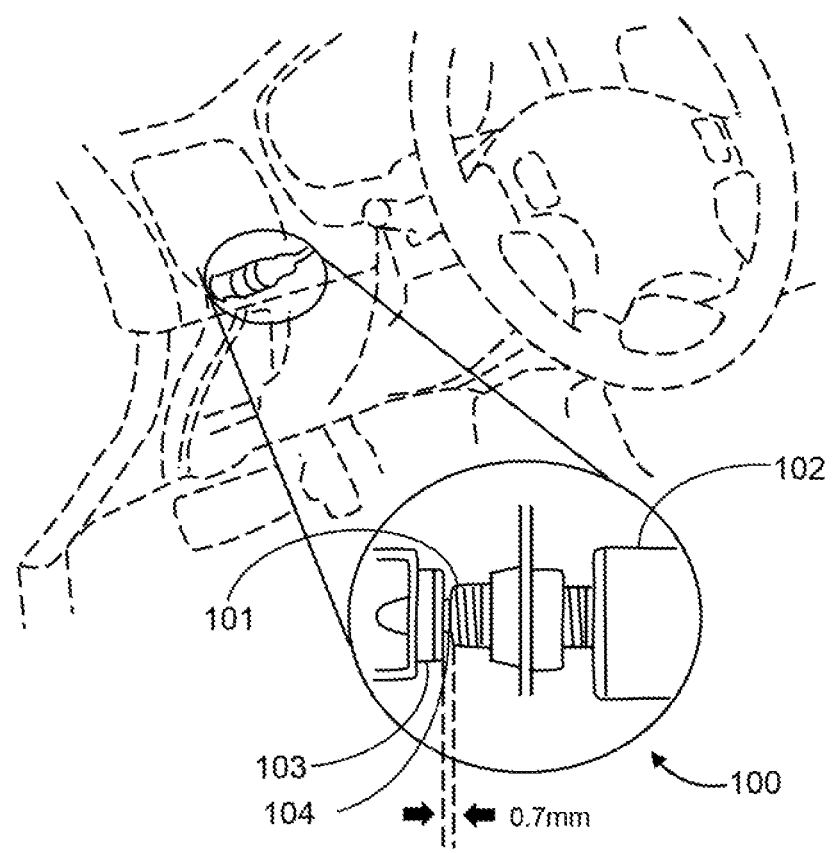
FIG. 1 exemplarily illustrates a brake switch assembly installed in an interior portion of a vehicle.

FIG. 1 exemplarily illustrates a brake switch assembly 100 installed in an interior portion of a vehicle. As shown, an adjustable portion 101 of a brake switch assembly 100 may be for example, a threaded portion, etc. The brake switch assembly 100, typically installed below the instrument panel proximal to the brake pedal 103, includes a brake switch 102 containing a spring-loaded plunger 104 that moves when a brake pedal 103 is depressed thereby activating the brake lights. During installation, an operator pushes the brake switch 102 through a sleeve to bottom out the plunger 104 against the brake pedal 103. The operator would then turn the brake switch housing clockwise (⅛ turn or angle) to lock in the position of the brake switch 102. The threads that lock the brake switch 102 (during rotation); pull the brake switch 102 out enough to result in a tolerance of 0.7 mm to the brake pedal 103. This means, the plunger 104 is exposed 0.7 mm. It will be appreciated that the clearance between the adjustable portion 101 of the brake switch 102 and the brake pedal 103 may not be limited to 0.7 mm and may vary as prescribed by a manufacturer, a model of a vehicle, or a brake switch type. Certain embodiments of the present disclosure help verify the clearance as being within the prescribed limits.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Reference will now be made in detail to specific aspects or features, examples of which are illustrated in the accompanying drawings. Wherever possible, corresponding or similar reference numbers will be used throughout the drawings to refer to the same or corresponding parts.

Figure 2:
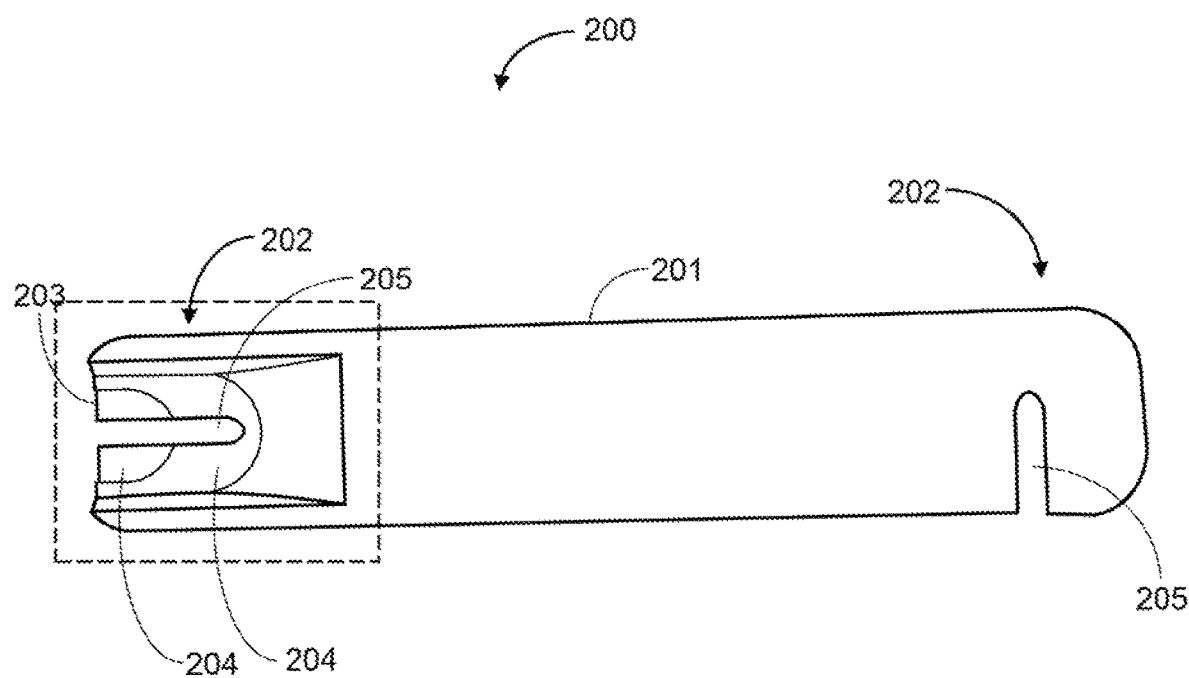
FIG. 2 exemplarily illustrates a top view of a device for checking gap tolerance between an adjustable portion of a brake switch and a brake pedal.

FIG. 2 exemplarily illustrates a top view of a device 200 for checking gap tolerance between an adjustable portion 101 of a brake switch 102 and a brake pedal 103, exemplarily illustrated in FIG. 1. The device 200 disclosed herein, functions similar to a limit gauge that is used to quickly verify whether an outside dimension of a clearance between the adjustable portion 101 of the brake switch 102 and the brake pedal 103 matches a preset gap tolerance. The device 200 is intended to be a quick and precise tolerance check, because one cannot (by eye) tell a difference in small variations in tolerance of 0.7 mm or more. As used herein, "preset gap tolerance" refers to a limit or permissible limits of variation in the clearance between the adjustable portion 101 of the brake switch 102 and the brake pedal, for example, 0.7 mm, 0.4 mm to 0.8 mm, etc. The preset gap tolerance may be set based on a manufacturer type, a brake switch type, or a vehicle model. The preset gap tolerance varies based on a gap specification set by the manufacturer or for a particular vehicle model. According to one embodiment, the device 200 for checking gap tolerance between the adjustable portion 101 of the brake switch 102 and the brake pedal 103 includes a handle 201 and one or more probes 202. The device 200 is provided with multiple probes 202 for improved associate ergonomics and/or dashboard layouts. For instance, in a single manufacturing plant producing distinct models from the same production line, the device 200 that fits well for one model may not clear surrounding components well for another. The provision of probes 202 at different ends of the device 200 and sized differently for the appropriate model allows an associate to choose which end of the device 200 to use.

Each of the one or more probes 202 include jaw portions 203 defining multiple stepped regions 204 of increasing thickness when advancing towards the handle 201. The jaw portions 203 further define a slot 205 that extends through the multiple stepped regions 204. The slot 205 is configured to be inserted between the adjustable portion 101 of the brake switch 102 and the brake pedal 103. A dimensional tolerance of the slot 205 in at least one of the stepped regions 204 equals a preset gap tolerance between the adjustable portion 101 of the brake switch 102 and the brake pedal 103. The stepped regions 204 may be semicircular, oval shaped, etc. Additionally, the stepped regions 204 may be configured in different shapes based on design requirements and are described in further detail in FIG. 4. Although, the device 200, shown in FIG. 2, contains two probes 202 disposed at both ends of the handle 201, it will be appreciated that the device may have more or less number of probes 202. Further, the slot 205 defined by the jaw portions 203 may be oriented in a configuration that is parallel or perpendicular to a length of the handle 201.

Figure 3:
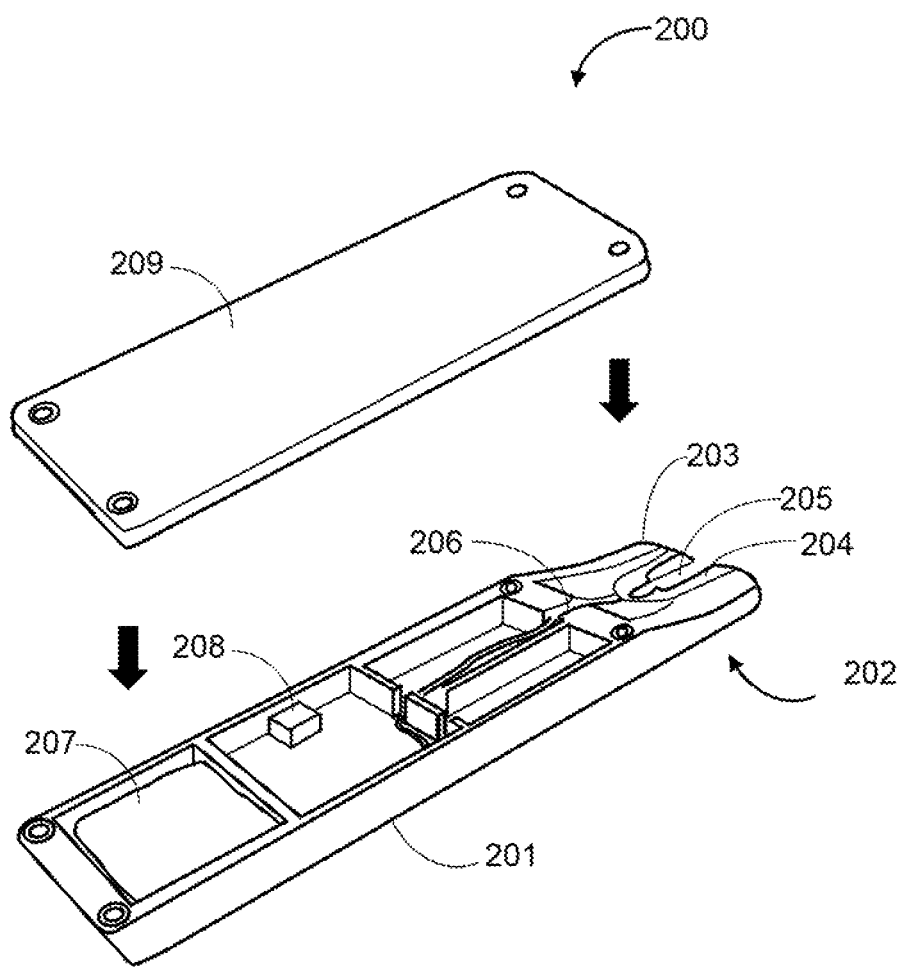
FIG. 3 exemplarily illustrates an exploded perspective view of an embodiment of a device provided in FIG. 2 containing electronics for powering the device.

FIG. 3 exemplarily illustrates an exploded perspective view of an embodiment of a device 200 provided in FIG. 2 containing electronics for powering the device 200. As described earlier, the device 200 includes a handle 201 and one or more probes 202, the probes 202 including jaw portions 203 defining stepped regions 204 and a slot 205. As exemplarily illustrated in FIG. 1, the brake switch 102 is typically installed proximal to a brake pedal 103 and below the instrument panel and steering column. Since the area surrounding the brake switch 102 is minimally lit, visibility is limited and verification or checking the gap tolerance setting is further affected reducing reliability of the setting verification. Depending on the vehicle assembly sequence, an illuminating means may be required to improve visibility while using the device 200. To overcome this drawback, the handle 201 of the device 200 houses a light source 206 integrated with a trigger switch. In an embodiment, the light source 206 is positioned in a cavity proximal to the probe 202 of the device 200. The light source 206 may include, for example, a light emitting diode (LED), an organic light emitting diode (OLED), etc. The light source 206 may be powered by a power source 207, for example, a battery, a rechargeable battery, etc. The batteries may include, for example, a Lithium Ion battery, a Nickel Cadmium battery, a Nickel Metal Hydride battery, etc. This updated LED tool features a Li-Ion battery, a charge controller, LED bulb, trigger switch, switch grommet and a housing for all the components. In certain exemplary implementations of the present disclosure, the light source 206 of the device 200 may be actuated using a light source actuation assembly. The light source actuation assembly includes a mechanical/trigger switch configured to close and open a power circuit. When the mechanical switch closes the power circuit, the light source 206 is activated. The mechanical switch may be housed within a switch grommet that may be manufactured using a 3-d printing process. The power circuit may further include a charge controller configured to regulate power supply from the power circuit to the light source 206. The inclusion of the charge controller ensures a steady charge that is required for the longevity of the power source 207 and offers a convenient Mini-USB port 208 in order to charge the power source 207. A cover 209 is fastened over the handle 201 to securely enclose the electronic components of the device 200 within the handle 201. All electronic components of the device 200 are replaceable further improving reusability and life of the device 200.

Figure 4:
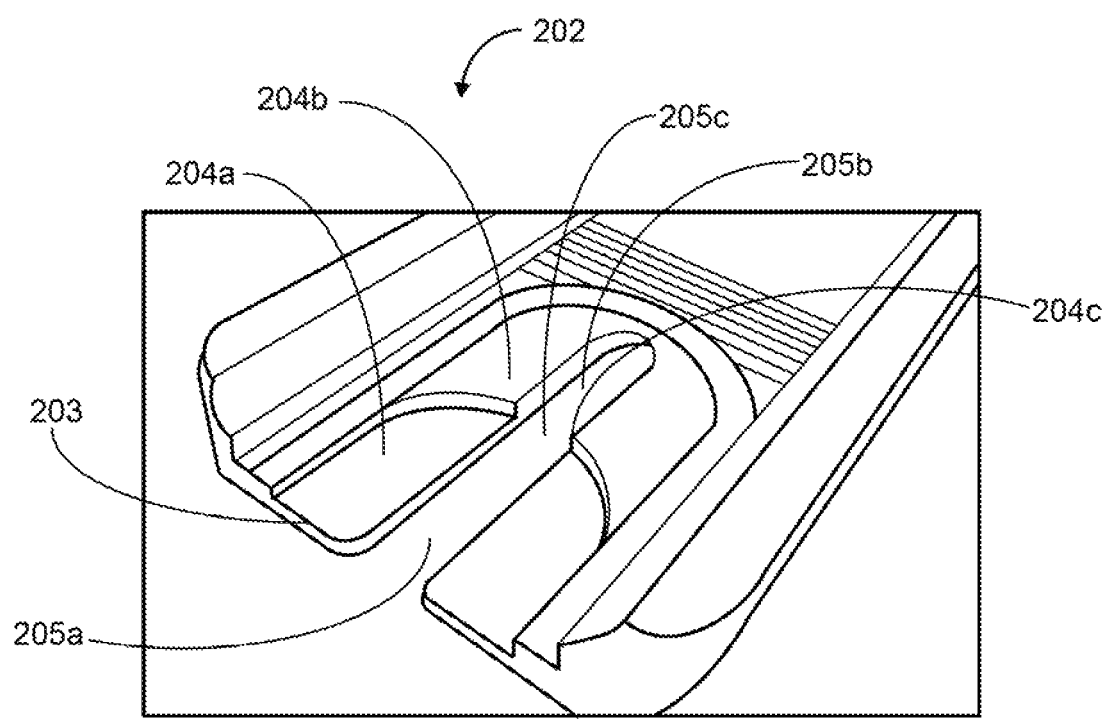
FIG. 4 exemplarily illustrates a perspective view of a portion of a probe of the device provided in FIG. 2.

FIG. 4 exemplarily illustrates a perspective view of a portion of a probe 202 of the device 200 illustrated in FIG. 2. Similar to a feeler/gap gauge, the probe 202 of the device 200 is inserted between the brake switch 102 and the brake pedal 103 (shown in FIG. 1). The probe 202 includes jaw portions 203 that define a first stepped region 204a, a second stepped region 204b, a neck region 204c, and a slot (205a, 205b, 205c). The first stepped region 204a is distal from the handle and the second stepped region 204b of larger area is proximal to the handle. The first and second stepped regions (204a, 204b) are contiguously connected by a neck region 204c. As used herein, the "slot" refers to a long, narrow aperture, groove, or notch defined by the jaw portions 203 of the probe 202 of the device. A first portion of the slot 205a extends through the first stepped region 204a and a second portion of the slot 205b extends into the second stepped region 204b of the probe 202. The slot (205a, 205b, 205c), defined by the jaw portions 203, is configured to be inserted between the adjustable portion 101 of the brake switch 102 and the brake pedal 103 as exemplarily illustrated in FIG. 1. The primary purpose of the slot (205a, 205b, 205c) is to clear the spring-loaded plunger 104 and to guide the device 200 correctly through the stepped regions (204a, 204b). A dimensional tolerance of the slot 205a in the first stepped region 204a is smaller than a preset gap tolerance between the adjustable portion 101 of the brake switch 102 and the brake pedal 103. In the neck region 204c of the probe 202, the dimensional tolerance of the slot 205c equals the preset gap tolerance between the adjustable portion 101 of the brake switch 102 and the brake pedal 103. Moreover, in the second stepped region 204b, the dimensional tolerance of the slot 205b is larger than the preset gap tolerance between the adjustable portion 101 of the brake switch 102 and the brake pedal 103. This design of the device captures all possible failure modes for an incorrectly set brake switch 102 (set with too large a gap, too small a gap, just right) without measuring any dimensions thereby quickening the inspection process. In certain embodiments, the jaw portions 203 may be made of separate pieces of hard material such as tungsten carbide for wear resistance that may be machined and ground out of a single block of metal. Alternatively, the device 200 may be manufactured from a tough steel or aluminum based alloy to reduce weight, preserve shape, and retain dimensions with extended and repeated use.

In operation, the first stepped region 204a of the probe 202 is slid between the adjustable portion 101 of the brake switch 102 and the brake pedal 103. The jaw portions 203 may be configured with an arbitrary taper. Further, the first stepped region 204a (thinnest portion) of the device 200 is sized to just under 0.7 mm and the second stepped region 204b (thickest portion) is sized for better visibility during operation. In one embodiment, the second stepped region 204b can be sized 1.4 mm. If the probe 202 cannot fit between the brake switch 102 and the brake pedal 103, then the gap tolerance between the adjustable portion 101 of the brake switch 102 and the brake pedal 103 is less than the preset gap tolerance, for example, 0.7 mm. However, if the probe 202 can be slid past the first stepped region 204a and cannot be slid past the neck region 204c, the gap tolerance is set just right or the gap tolerance equals the preset gap tolerance. In case the probe 202 can be slid past the neck region 204c, the gap tolerance is more than the preset gap tolerance, for example, exceeding 0.7 mm. In the cases where the gap tolerance exceeds or is less than the preset gap tolerance, the necessary adjustments must be made to reduce or increase the gap tolerance.

Since no measurement is taken, this check is completed by simply sliding the machined steps of the probe 202 between the brake pedal 103 and the adjustable portion 101 of the brake switch 102 until the device 200 cannot move any further. As such, the verification is quickly completed and the operation can be easily executed by an operator without much training further simplifying the use of the device 200. The quick and reliable verification provided by the device 200 helps prevent market outflow of incorrectly set brake switches. Further, the device 200 captures possible failure modes for an incorrectly set brake switch, for example, a brake switch set with too large gap tolerance or too small of a gap tolerance simultaneously thereby eliminating the need for multiple tools for the different failure modes. Furthermore, the device 200 with multiple probes 202 is intended for improved ergonomics and/or dashboard layouts.

Figure 5:
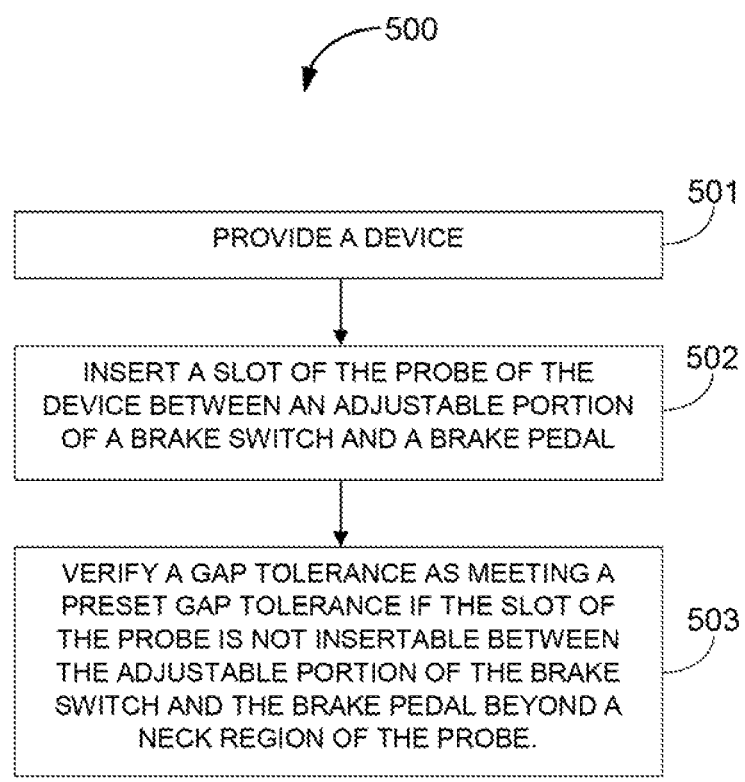
FIG. 5 exemplarily illustrates a flowchart showing a method for checking gap tolerance between an adjustable portion of a brake switch and a brake pedal.

FIG. 5 exemplarily illustrates a flowchart showing a method 500 for checking gap tolerance between an adjustable portion 101 of a brake switch 102 and a brake pedal 103. The following detailed description must be read in conjunction with the detailed descriptions of FIGS. 1-4.

At Step 501, a device 200 for checking gap tolerance between an adjustable portion 101 of a brake switch 102 and a brake pedal 103 is provided. As disclosed earlier, the device 200 includes a handle 201 and a probe 202. The probe 202 extends from the handle 201 and includes jaw portions 203. The jaw portions 203 define a first stepped region 204a distal from the handle 201 and a second stepped region 204b of larger area proximal to the handle 201. The first and second stepped regions (204a, 204b) are contiguously connected by a neck region 204c. The jaw portions 203 further define a slot 205 extending through the first and the second stepped regions (204a, 204b).

At Step 502, the slot 205 of the probe 202 of the device 200 is inserted between the adjustable portion 101 of the brake switch 102 and the brake pedal 103.

At Step 503, the gap tolerance is verified as meeting the preset gap tolerance if the slot 205 of the probe 202 is not insertable beyond the neck region 204c of the probe 202.

If the preset gap tolerance is not met, an operator may accordingly adjust the brake switch 102 such that the gap tolerance between the adjustable portion 101 of the brake switch 102 and the brake pedal 103 falls within the preset gap tolerance.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A device for checking gap tolerance between an adjustable portion of a brake switch and a brake pedal, the device comprising:
    a handle; and
    one or more probes extending from the handle, each of the one or more probes comprising:
        jaw portions defining:
            a plurality of stepped regions of increasing thickness with decreasing distance from the handle; and
            a slot extending through the plurality of stepped regions, the slot configured to be inserted between the adjustable portion of the brake switch and the brake pedal, wherein a dimensional tolerance of the slot in at least one of the plurality of stepped regions equals a preset gap tolerance between the adjustable portion of the brake switch and the brake pedal.

2. The device according to claim 1, further comprising a light source housed within the handle.

3. The device according to claim 2, wherein the light source is powered by one of a battery and a rechargeable power circuit.

4. The device according to claim 1, wherein the slot is defined parallel or perpendicular relative to a length of the handle.

5. The device according to claim 1, wherein the preset gap tolerance of the one or more probes is set based on a manufacturer type, a brake switch type, and a model of a vehicle.

6. The device according to claim 1, further comprising a light source actuation assembly with a mechanical switch configured to close and open a power circuit; and
    the light source configured to be activated upon closing of the power circuit by the mechanical switch.

7. The device according to claim 1, wherein the one or more probes are disposed at opposing ends of the handle.

8. A device for checking gap tolerance between an adjustable portion of a brake switch and a brake pedal, the device comprising:
    a handle configured to house a light source and a power circuit; and
    a probe extending from the handle comprising:
        jaw portions defining:
            a first stepped region distal from the handle and a second stepped region of larger area proximal to the handle, wherein the first and second stepped regions are contiguously connected by a neck region; and
            a slot extending through the first and the second stepped regions, the slot configured to be inserted between the adjustable portion of the brake switch and the brake pedal, wherein a dimensional tolerance of the slot:
                in the first stepped region is smaller than a preset gap tolerance between the adjustable portion of the brake switch and the brake pedal;
                in the neck region equals the preset gap tolerance between the adjustable portion of the brake switch and the brake pedal; and in the second stepped region is larger than the preset gap tolerance between the adjustable portion of the brake switch and the brake pedal.

9. The device according to claim 8, further comprising a charge controller configured to regulate power supply from the power circuit to the light source and provide a balanced charge to the power supply/battery.

10. The device according to claim 8, wherein one of a battery and a rechargeable power circuit powers the light source.

11. The device according to claim 8, wherein the slot is defined parallel or perpendicular relative to a length of the handle.

12. The device according to claim 8, further comprising a light source actuation assembly with a
    mechanical switch configured to close and open the power circuit; and
    the light source configured to be activated upon closing of the power circuit by the mechanical switch.

13. The device according to claim 8, wherein a different size probe may be used wherein the preset gap tolerance varies based on a gap specification.

14. A method for checking gap tolerance between an adjustable portion of a brake switch and a brake pedal, the method comprising:
    providing a device comprising:
        a handle; and
        a probe extending from the handle, the probe comprising,
            jaw portions defining:
                a first stepped region distal from the handle and a second stepped region of larger area proximal to the handle, wherein the first and second stepped regions are contiguously connected by a neck region; and
                a slot extending through the first and the second stepped regions;
    inserting the slot of the probe of the device between the adjustable portion of the brake switch and the brake pedal; and
    verifying the gap tolerance between the adjustable portion of the brake switch and the brake pedal as meeting the preset gap tolerance if the slot of the probe is not insertable beyond the neck region of the probe.

15. The method according to claim 14, wherein the device further comprises a light source powered by one of a battery and a rechargeable power circuit.

16. The method according to claim 15, wherein a charge controller is configured to regulate power supply from the rechargeable power circuit to the light source.

17. The method according to claim 14, wherein the slot is defined parallel or perpendicular relative to a length of the handle.

18. The method according to claim 14, wherein the preset gap tolerance of the probe is set based on a manufacturer type, a model of a vehicle, or a brake switch type.

19. The method according to claim 14, wherein the device further comprises a light source actuation assembly with
    a mechanical switch configured to close and open the power circuit; and the light source configured to be activated upon closing of the power circuit by the mechanical switch.

20. The method according to claim 14, wherein a thickness of the first stepped region is lesser than a thickness of the second stepped region.

\* \* \* \* \*